United States Patent [19]

DeMatos

[11] 4,346,429
[45] Aug. 24, 1982

[54] MULTILAYER CERAMIC CAPACITOR WITH FOIL TERMINAL

[75] Inventor: Henrique V. DeMatos, Greenville, S.C.

[73] Assignee: Union Carbide Corporation, Danbury, Conn.

[21] Appl. No.: 167,191

[22] Filed: Jul. 9, 1980

[51] Int. Cl.³ .............................................. H01G 1/14
[52] U.S. Cl. .................................... 361/310; 361/275; 361/321
[58] Field of Search ............... 361/275, 321, 405, 310

[56] References Cited

U.S. PATENT DOCUMENTS

| | | | |
|---|---|---|---|
| 1,768,440 | 6/1930 | Dublier | 361/310 |
| 2,279,826 | 4/1942 | Kater | 361/275 |
| 3,231,798 | 1/1966 | McCutchen | 361/275 X |
| 3,275,916 | 9/1966 | Phillips | 361/275 X |
| 3,829,738 | 8/1974 | Makihara | 361/310 |
| 4,004,200 | 1/1977 | Johanson | 361/310 |

*Primary Examiner*—Elliot A. Goldberg
*Attorney, Agent, or Firm*—Frederick J. McCarthy, Jr.

[57] ABSTRACT

A ceramic chip capacitor having a metal foil terminal strip configuration which reduces high frequency inductance.

1 Claim, 8 Drawing Figures

MULTILAYER CERAMIC CAPACITOR WITH FOIL TERMINAL

The present invention relates to multilayer ceramic capacitors. More particularly the present invention relates to a multilayer ceramic capacitor having low inductance.

Multilayer ceramic capacitors are regularly used in electronic equipment due to their small size, good electrical characteristics and reliability. Capacitors of this type and a common method for their manufacture are disclosed in U.S. Pat. No. 3,612,963 J. Piper et al. In general, multilayer ceramic capacitors can be made by screen printing electrode patterns on a green ceramic sheet in accordance with well known techniques using an electrode forming material, i.e. an ink, containing a finely divided noble metal constituent. The electrode patterns supported on the green ceramic are stacked in a multilayer capacitor configuration, such as described in U.S. Pat. No. 3,612,963, and the capacitor configuration is fired to sinter the green ceramic and form a ceramic chip capacitor.

Ceramic chip capacitors in cubic shape, or other rectangular cross section form are provided with metallizations at opposite end portions and these end metallizations are commonly attached to a circuit board or other substrate by terminal lead attachments.

The configuration of the terminal lead attachments is known to affect the electrical properties of a capacitor in particular the high frequency inductance characteristics. This is indicated in U.S. Pat. No. 3,971,970 which describes a lead terminal configuration with particular reference to solid tantalum capacitors. The patent teaches the desirability of short, parallel lead out conductors having a minimum separation and equal width dimensions. U.S. Pat. No. 3,822,397 teaches the connection of aluminum foil capacitor elements to closely spaced parallel, planar lead out conductors. The technical basis for these designs is presented in the publication of F. W. Grover, Inductance Calculations: Working Formulas and Tables (Dover Publications, Inc., N.Y. 1962).

It is an object of the present invention to provide an improved multilayer ceramic capacitor device having low inductance at high frequencies.

It is also an object of the present invention to provide a device which is easily manufactured. Other objects will be apparent from the following description and claims taken in conjunction with the drawings wherein FIG. 1 shows a multilayer ceramic chip capacitor as known in the art.

FIG. 2 shows a preferred embodiment of the present invention wherein the capacitor chip of FIG. 1 is provided with terminal leads and connections which result in low lead inductance.

FIGS. 2(a) and 2(b) are plan and elevation views of FIG. 2.

Figure 1:
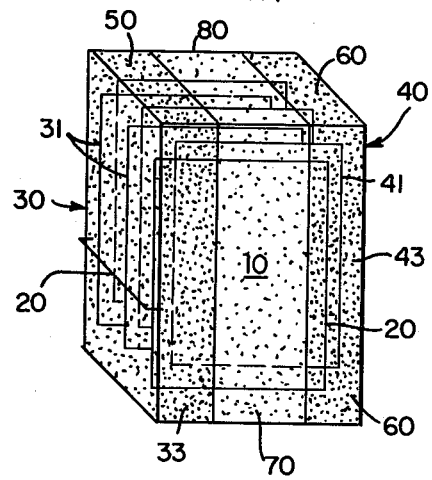
Figure 2:
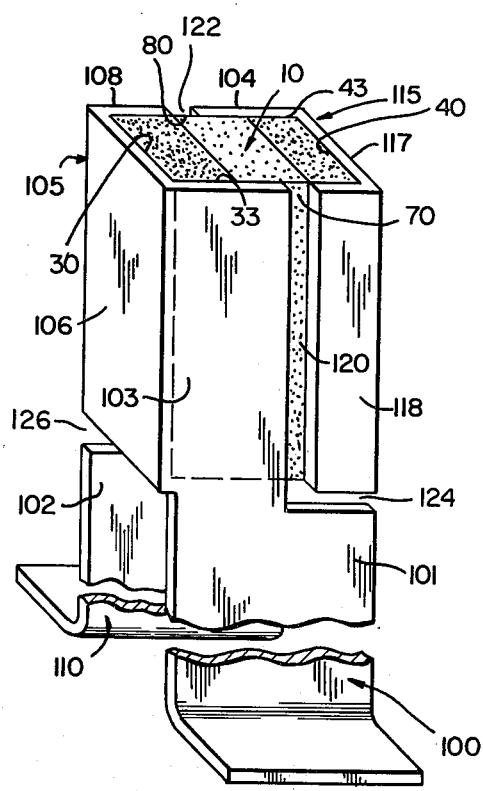
Figure 2B:
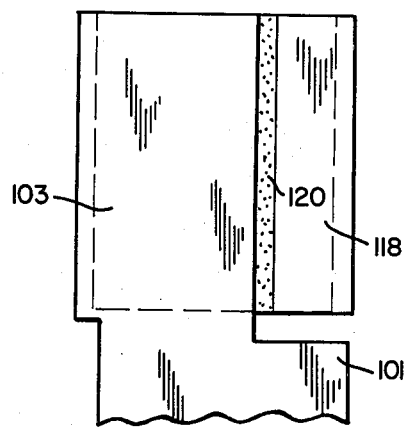
Figure 2A:
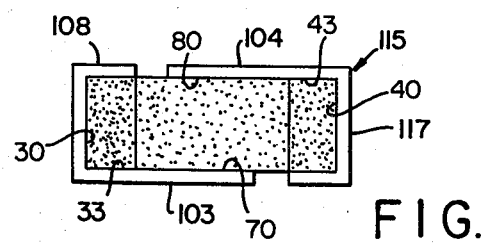

With reference to FIG. 1 a multilayer ceramic capacitor chip is indicated at 10 containing a plurality of embedded electrodes 20. In accordance with conventional practice the edges 32, 41 of alternate embedded electrodes are exposed at rectangular end surfaces 30 and 40 of ceramic capacitor chip 10. Following conventional practice, the opposite end portions of ceramic capacitor chip 10 are metallized as shown at 50, 60 whereby ceramic end surfaces 30, 40 are metallized and also relatively small contiguous ceramic portions 33, 43 of the opposing, parallel rectangular major surfaces 70, 80 of ceramic capacitor chip 10. Surfaces 70, 80 are substantially larger than end surfaces 30, 40 and are parallel to embedded electrodes 20. The metallization, which is suitably a noble metal paste provides an electrical connection with electrodes 20 at the exposed edges 31, 41. With metallization applied, the ceramic capacitor chip is provided with a terminal lead configuration as illustrated in FIG. 2. With reference to FIG. 2, a pair of metal foil strip terminal leads, suitably made of nickel, 10 mils thick, is shown at 100, 110. Terminal lead 100 has an integral strip portion 101 of substantially the same width as the ceramic capacitor chip 10, i.e. the distance between end surfaces 30, 40. Terminal lead 110 has a corresponding strip portion 102. Metal foil strip portions 101 and 102 are opposed and parallel and are respectively parallel to the major side surfaces 70, 80 of ceramic capacitor chip 10. An integral extension 103 of strip portion 101 overlies metallized portion 33 of side surface 70 and also overlies most of the unmetallized ceramic surface of side 70. Strip portion 102 has a corresponding integral extension 104 which overlies metallized portion 43 of side surface 80 and also overlies most of the unmetallized ceramic surface of side 80. A further integral extension 105 of strip portion 101, of L-shaped cross section, overlies at 106 adjacent metallized end surface 30 and, at 108, the contiguous relatively small metallized portion on the opposite side surface 80. Strip portion 104 has a corresponding integral extension 115 of L-shaped cross section, which overlies at 117 the adjacent metallized end surface 40 and at 118 the relatively small contiguous metallized portion of side surface 70. The integral L-shaped extensions 105 and 115 are pre-formed by bending the metal foil at 90° angles to accommodate the dimensions of ceramic chip 10. The metallized surfaces underlying metal foil are metallurgically bonded to the metal foil, e.g. by soldering. The unmetallized portions of the ceramic capacitor chip 10 underlying metal foil are not bonded to the adjacent metal foil. As can be seen from the drawing, except for the relatively narrow spaces 120, 122, which are made wide enough to avoid short circuiting leads 102 and 101, ceramic capacitor chip 10 is enclosed at its end surfaces and major side surfaces (which are parallel to the capacitor electrodes), but a symmetrical metal foil lead terminal configuration. This configuration provides low inductance at high frequencies and structural support for the capacitor and ease of manufacture.

The following Examples will further illustrate the present invention.

EXAMPLE 1

Finely divided powder containing about 90 mol% barium titanate balance calcium zirconate (bismuth free, i.e. less than 0.1% by weight) sized <2.0μ was mixed with 10% by weight plasticized polyvinyl alcohol and slip cast and dried to provide green ceramic tape about 1.5 mils thick.

Rectangular electrode patterns (0.235×0.140×0.0003″) were screen printed on the green ceramic tape using a 325 mesh (U.S. Series) stainless steel screen. The ink was prepared by blending 70% Pd—30% Ag coprecipitated powder having a surface area of 4 to 6 $M^2$/gram with an organic vehicle containing about 5% by weight ethyl cellulose dissolved in butyl cellosolve in proportions of 50% of powder to 50% vehicle. The mixture was homogenized by being passed through a 3-roll mill.

The printed green ceramic tape was cut into strips and stacked in a capacitor configuration. The capacitor configuration was arranged to have 40 printed electrodes, i.e. 39 active dielectric layers and, after firing, dimensions of 0.245 inch×0.140 inch×0.055 inch. The green ceramic sheet was designed to fire to a 1.2 mil thickness and have a dielectric constant of about 7000.

The stacked electrode configuration was fired at 1335° C. for 1 hour in air and metallized with 20 Pd-80 Ag end termination paste. This produced a ceramic capacitor chip with a nominal capacitance value of 1.0 $\mu$F at 1 KHz and 25° C. of the type shown in FIGS. 1 and 3.

Figure 3:
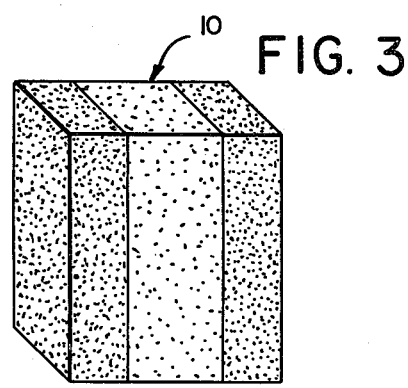
FIGS. 3 and 4 illustrate the assembly of the capacitor of FIG. 2.
Figure 5:
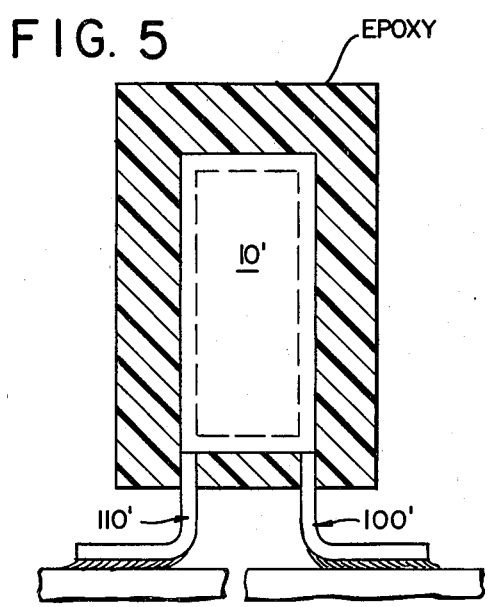
FIG. 5 shows a finished, encapsulated capacitor having the construction shown in FIG. 2

The ceramic capacitor chip was inserted into a terminal lead configuration of the type shown in FIGS. 2 and 3 and electrically connected to the terminal lead configuration by soldering. The device was then enclosed in a molded epoxy case as illustrated in FIG. 5. Using a four terminal test fixture, high frequency signal source and amplitude and phase detector, the impedance of the molded capacitor was determined. The range of frequencies over which the impedance was measured was 1 MHz to 100 MHz inclusive. The impedance, at frequencies above resonance, is essentially represented by the inductive reactance and varies directly with the inductance. In this ceramic capacitor device, the resonant frequency was approximately 4 MHz. The impedance of the ceramic capacitor device over the frequency range mentioned is shown in Column B of Table 1.

TABLE 1

| Column A Frequency- MHz | Column B Impedance Ohms (Ex. I) Device of This Invention | Column C Impedance Ohms (Ex. II) Prior Art Device |
| --- | --- | --- |
| 1.0 | 0.130 | 0.130 |
| 1.5 | 0.079 | 0.078 |
| 2.0 | 0.051 | 0.054 |
| 3.0 | 0.020 | 0.046 |
| 4.0 | 0.009 | 0.060 |
| 6.0 | 0.019 | 0.091 |
| 8.0 | 0.033 | 0.117 |
| 10.0 | 0.048 | 0.144 |
| 15.0 | 0.072 | 0.197 |
| 20.0 | 0.098 | 0.245 |
| 30.0 | 0.146 | 0.334 |
| 40.0 | 0.186 | 0.422 |
| 60.0 | 0.271 | 0.599 |
| 80.0 | 0.320 | 0.714 |
| 100.0 | 0.374 | 0.830 |

EXAMPLE II

Figure 6:
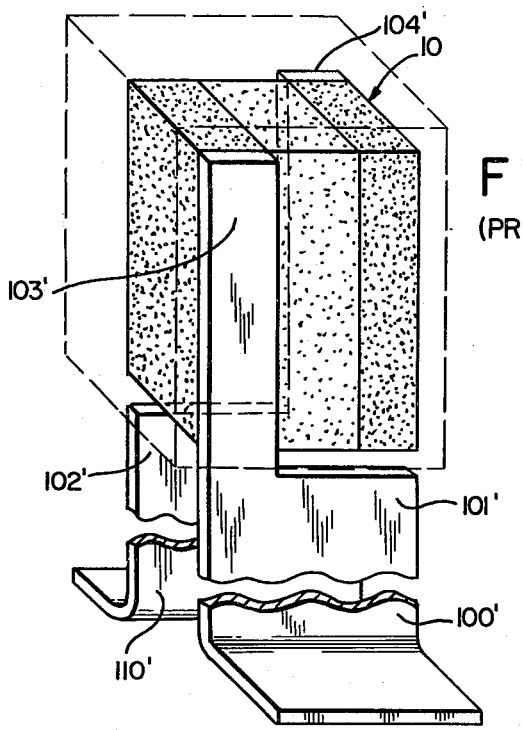
FIG. 6 shows a capacitor construction wherein the terminal strips are joined to the metallization of the capacitor chip in a conventional prior art manner.

The same procedure was followed as in Example I except that the terminal lead configuration was of the type shown in FIG. 6 wherein only a metallized portion of the ceramic chip capacitor was covered by metal foil.

The impedance of the ceramic capacitor device of Example II is shown in Column C of Table 1.

As can be seen from a comparison of Examples I and II (Columns B and C of Table 1), the ceramic capacitor device of the present invention has significantly reduced impedance (and hence inductance) at high frequencies.

Figure 4:
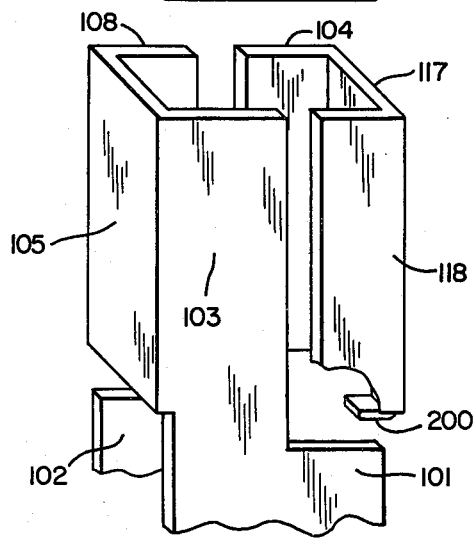

As taught in U.S. Pat. No. 3,971,970, it is preferable to keep at a minimum the lengths of strip leads (Col. 1, Lines 19, 20). Accordingly, it is desirable to hold the spaces 124 and 126 shown in FIG. 2 to a minimum providing only sufficient space to avoid short circuiting the leads 100 and 110. By providing a snug nest for the ceramic capacitor chip as shown in FIG. 3, the lead configuration of the present invention assists in the maintaining of the small spaces 120, 122, 124 and 126 during volume manufacture of the device. The precision of the assembly can be further assisted by the inclusion of a tab support 200 as shown in FIG. 4 to assure a positive vertical positioning of the capacitor chip in the nest provided by the leads.

What is claimed is:

1. A ceramic capacitor device comprising a ceramic chip containing embedded electrodes having a pair of opposed rectangular shaped end surfaces at which surfaces ends of alternate embedded electrodes are exposed and a pair of opposed rectangular shaped side surfaces parallel to said embedded electrodes and substantially larger in area than said opposed end surfaces, each opposed end surface being metallized to provide an electrical contact with exposed ends of embedded electrodes, and portions of each opposed side surface which are contiguous to an end surface being metallized to provide a pair of spaced apart metallized portions on each opposed side surface separated by unmetallized ceramic, a pair of metal foil terminal leads each having a strip portion of substantially the same width as the distance between the opposed end surfaces of the cermanic chip said strip portions being opposite and parallel to each other and parallel to the side surfaces of said ceramic chip, each said strip portion having (i) a first extension overlying one metallized portion of the side surface closest to said strip portion and also overlying most of the unmetallized ceramic of the same side surface and (ii) a second extension of substantially L-shaped cross section overlying the metallized end surface adjacent the aforesaid metallized side surface portion and the metallized portion of the other side surface contiguous to said metallized end surface, the said metallized portions being metallurgically bonded to said overlying metal foil extensions.

* * * * *